(12) United States Patent
Asahina et al.

(10) Patent No.: US 8,512,479 B2
(45) Date of Patent: Aug. 20, 2013

(54) METHOD OF CLEANING INSIDE OF PRESSURE VESSEL FOR BLASTING

(75) Inventors: Kiyoshi Asahina, Kobe (JP); Ryusuke Kitamura, Kobe (JP); Keiichi Ishiyama, Kobe (JP); Tsuyoshi Imakita, Kobe (JP); Shigeo Tachibana, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 552 days.

(21) Appl. No.: 12/226,875

(22) PCT Filed: Apr. 26, 2007

(86) PCT No.: PCT/JP2007/059046
§ 371 (c)(1),
(2), (4) Date: Oct. 30, 2008

(87) PCT Pub. No.: WO2007/129592
PCT Pub. Date: Nov. 15, 2007

(65) Prior Publication Data
US 2009/0165636 A1 Jul. 2, 2009

(30) Foreign Application Priority Data
May 2, 2006 (JP) .................................. 2006-128450

(51) Int. Cl.
*B08B 9/08* (2006.01)
*F42B 33/06* (2006.01)

(52) U.S. Cl.
USPC ................................................ 134/19; 86/50

(58) Field of Classification Search
USPC ....................................................... 588/403
See application file for complete search history.

(56) References Cited

U.S. PATENT DOCUMENTS

| 4,089,702 A * | 5/1978 | Enoksson et al. ................. 134/1 |
| 5,419,862 A | 5/1995 | Hampel |
| 5,522,326 A | 6/1996 | Vollhardt |
| 7,435,866 B2 | 10/2008 | Ishiyama et al. |

(Continued)

FOREIGN PATENT DOCUMENTS

| CN | 1340148 A | 3/2002 |
| DE | 4117504 C1 | 11/1992 |

(Continued)

OTHER PUBLICATIONS

Office Action from Russian Patent Office regarding Application No. PCT/JP2007/059046, in Russian and English.

(Continued)

*Primary Examiner* — Joseph L Perrin
*Assistant Examiner* — Caitlin N Dunlap
(74) *Attorney, Agent, or Firm* — Stites & Harbison PLLC; Juan Carlos A. Marquez, Esq.; Stephen J. Weyer, Esq.

(57) ABSTRACT

Provided is a method of cleaning the inside of a pressure vessel for blasting to enable a short-time treatment regardless of the state of residual substances. This method includes: a step of setting an explosive for cleaning, different from an explosive for blasting, in an amount necessary for decomposing a residue of the object inside of a pressure vessel after a blasting step of setting and blasting the object and the explosive for blasting in the pressure vessel; and a step of decomposing the residue by exploding the explosive for cleaning in the pressure vessel.

4 Claims, 3 Drawing Sheets

(56) References Cited

U.S. PATENT DOCUMENTS

| | | | |
|---|---|---|---|
| 8,153,855 B2* | 4/2012 | Asahina et al. | 588/403 |
| 2003/0050525 A1 | 3/2003 | Ishiyama et al. | |
| 2003/0209133 A1* | 11/2003 | Greenfield et al. | 86/50 |

FOREIGN PATENT DOCUMENTS

| | | |
|---|---|---|
| DE | 197 31 027 C1 | 10/1998 |
| EP | 1 176 386 A2 | 1/2002 |
| EP | 1 176 386 A3 | 1/2002 |
| GB | 1 532 050 | 11/1978 |
| JP | 7-208899 | 1/1994 |
| JP | 3515755 | 12/2000 |
| JP | 2003-310792 | 4/2002 |
| JP | 2003-185399 | 9/2002 |
| JP | 2006-010108 | 6/2004 |
| RU | 2 194 322 C2 | 12/2002 |
| WO | WO 01/48437 A1 | 7/2001 |

OTHER PUBLICATIONS

International Search Report regarding International Application No. PCT/JP2007/059046 dated Jul. 17, 2007.

Extended European Search Report from European Patent Office for Application No./Patent No. 07742481.0-1260/2019280 PCT/JP2007/059046 dated May 25, 2011.

Office Action from Chinese Patent Office for Corresponding Chinese Patent Application No. 200780015977.9, dated Apr. 25, 2011.

* cited by examiner

METHOD OF CLEANING INSIDE OF PRESSURE VESSEL FOR BLASTING

TECHNICAL FIELD

The present invention relates to a method for decomposing a residue of an object to be blasted such as an explosive material in a pressure vessel to clean it, following a blasting step of setting the object to be blasted and an explosive for blasting in the pressure vessel and blasting the object.

BACKGROUND ART

There is previously known a method of detonating or bursting an explosive material to dispose it. Examples of the explosive material include a military explosive material used for a chemical weapon or the like (e.g., projectile, bomb, land mine, and naval mine), which specifically includes a steel shell filled with a burster and a substance hazardous to a human body, for example. Example of the hazardous substance can be a chemical agent such as mustard or lewisite toxic to a human body.

That blasting method, which does not require disassembling an object to be treated, is suitable for treatment of the above explosive materials. This method enables treatment of not only well-preserved ammunition but also hard-to-disassemble ammunition because of its secular deterioration or distortion. Further, the explosion generates ultra-high temperature and pressure which can decompose almost all of the hazardous substances. This method is, for example, disclosed in Patent Document 1.

The blasting disposal is frequently performed within a tightly sealed pressure vessel to prevent a hazardous substance from outside-leakage or to reduce adverse effects on environment such as noise, vibration or the like produced by the blasting. The blasting can generate an off-gas containing a fuel component such as CO, $H_2$ and $CH_4$ or a residue of the above hazardous substances. The fuel component or residual hazardous substances contained in the off-gas is required to be cleaned (detoxified) to a reference value or below before the discharge of the off-gas to the atmosphere. A bursting disposal of an explosive material without the above hazardous substances also requires cleaning a fuel-component thereafter. In addition, the time for cleaning is desired to be short.

For the cleaning, conventionally known is a method of neutralizing a residual substance with an agent, but the neutralization takes a long time, depending upon the state of the residue. For example, a reaction of solid residue can require a long time. In the case where the residual substance is constituted by not a single substance but several substances, the treatment of it may be required to be separately conducted several times.

Patent Document 1: Japanese Patent Laid-Open Publication No.

DISCLOSURE OF THE INVENTION

It is an object of the present invention to provide a method of cleaning the inside of a pressure vessel for blasting to shorten a treatment time regardless of the state of residual substances. To accomplish the object, a method of cleaning the inside of a pressure vessel for blasting according to the present invention includes: a step of setting an explosive for cleaning, different from an explosive for blasting used for an object to be blasted, in an amount necessary for decomposing a residue of the object inside of a pressure vessel, following a blasting step of setting the object to be blasted in the pressure vessel and bursting it therein; and a step of exploding the explosive for cleaning in the pressure vessel to decompose the residue.

In this cleaning method, simply setting the explosive for cleaning inside of the pressure vessel and exploding the set explosive for cleaning achieve a cleaning treatment in a short time.

BEST MODE FOR IMPLEMENTING THE INVENTION

A method of cleaning the inside of a pressure vessel for blasting according to the present invention will be below described with reference to the drawings.

Figure 1:
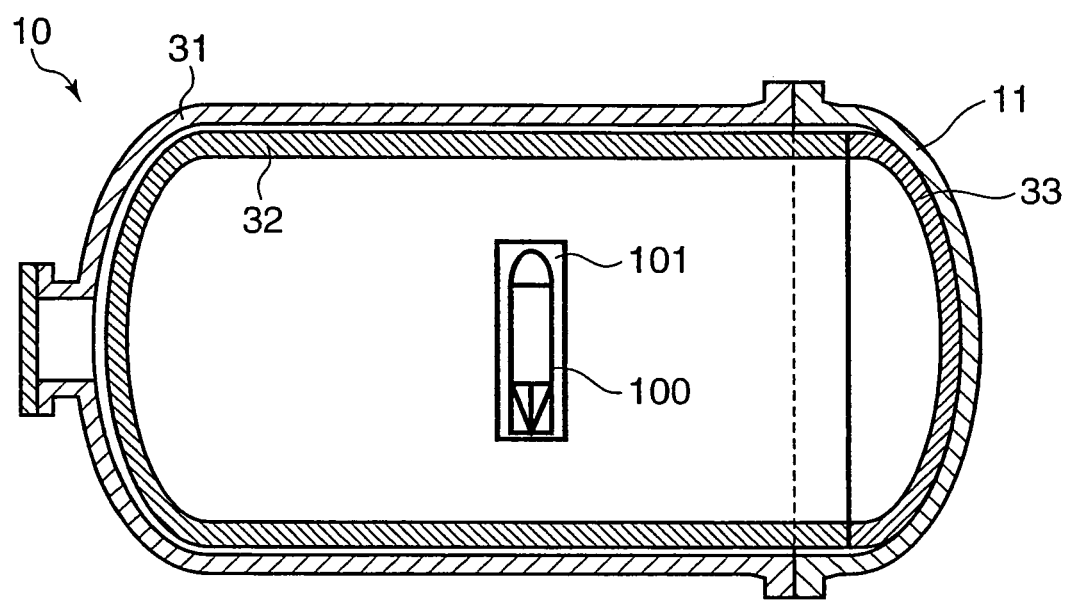
FIG. 1 is a sectional view of a pressure vessel used in a method of cleaning the inside of a pressure vessel for blasting according to the present invention.
Figure 2:
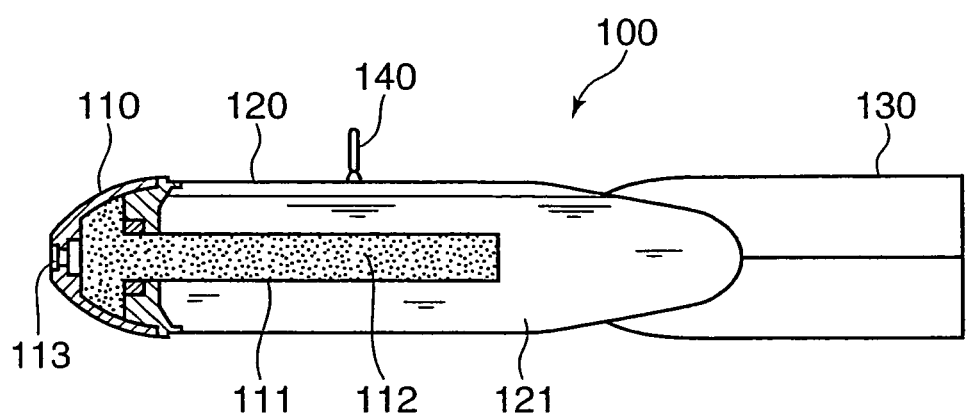
FIG. 2 is a sectional view of a chemical bomb treated in the pressure vessel of FIG. 1.

FIG. 1 shows a pressure vessel 10 for blasting in which a method of cleaning the inside thereof according to the present invention is performed. The pressure vessel 10 has a double structure of an outer vessel 31 and an inner vessel 32. The outer vessel 31 is a strong pressure vessel made of steel or the like having a sufficient strength to withstand a pressure produced by blasting an object to be treated. The inner vessel 32 is made of a strong material such as steel to withstand a collision with fragments scattered at the time of the blasting.

The outer vessel 31 is cylindrically formed with both ends in the axial directions: one of the ends is closed and the other is open. To the open end is removably attached a removable pressure-resistant lid 11 for opening and closing the end. Similarly, the inner vessel 32 is cylindrically formed with both ends in the axial directions: one of the ends is closed and the other is open. The open end is positioned inside of the outer vessel 31 so as to face the pressure-resistant lid 11. To the open end is removably attached a inner lid 33 for opening and closing the end.

The inner vessel 32 is not securely fixed but loosely installed inside of the outer vessel 31 to be allowed to make a slight relative movement against the outer vessel 31. This loose installation of the inner vessel 32 protects the outer vessel 31 from direct transmission of a shock generated by an explosion and the collision with scattered fragments and prevents an application of an excessive force to the connection region (fixing region) between the inner vessel 32 and the outer vessel 31, thereby inhibiting damage in the connection part to improve the durability of the pressure vessel 10.

In the inner vessel 32 is performed a blasting disposal of an object to be blasted such as a chemical bomb, followed by a cleaning process of a residual substance inside of the pressure vessel 10 by the method according to the present invention.

There is a burster tube 111 extending rearward from a head 110, accommodating a burster (explosive) 112. Inside of the head 110 is provided with a fuze 113 for bursting the burster 112 in the burster tube 111.

The burster tube 111 is accommodated in a bomb shell 120, which is connected to the head 110 and filled with a chemical 121. Attitude controlling fins 130 are provided at the end of the bomb shell 120 opposite to the head 110 in the axial directions, to control the attitude of a chemical bomb 100 when it is dropped.

The burster (explosive) 112 can be a military explosive such as TNT, a picric acid or RDX. The chemical (hazardous substance) 121 may be, for example, blister agents such as mustard gas or lewisite, vomiting agents such as DC or DA, phosgene, sarin, hydrocyanic acid, or the like, whether liquid or solid.

The chemical bomb 100 is blasted in the pressure vessel 10 by use of an explosive for blasting, finally leaving a residual substance in the pressure vessel 10. The residual substance is to be cleaned according to the present invention. In detail, as shown in FIG. 1, the chemical bomb 100 surrounded by an explosive 101 for blasting is set into the pressure vessel 10 by a fixing device (not shown), and thereafter the inner lid 33 and the pressure-resistant lid 11 are attached to the inner vessel 32 and the outer vessel 31 respectively to enclose the each vessel 32, 31. In this closed state, a blasting step is performed, wherein the explosive 101 for blasting is blasted by a detonating apparatus (not shown), thereby blasting the chemical bomb 100. The blasting disposal is performed once or more times.

Figure 3:
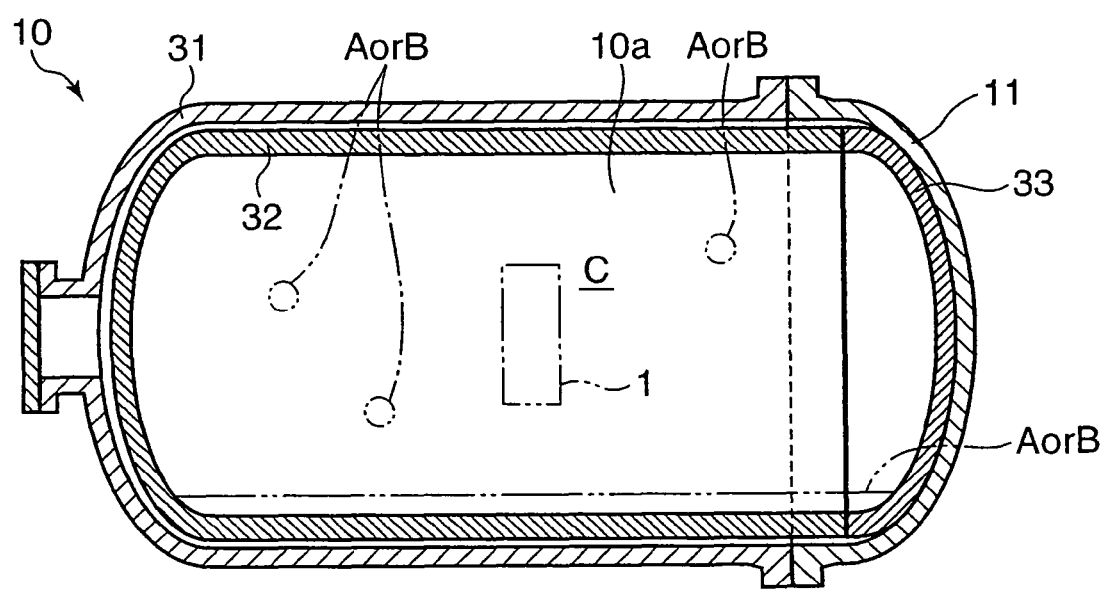
FIG. 3 is a sectional view showing the cleaning method according to the present invention.

The blasting step leaves a residual substance to be cleaned according to the present invention in the pressure vessel 10. This residual substance remains inside of the inner vessel 32 of the pressure vessel 10 in various forms, depending upon the kind of the chemical bomb 100 or the conditions of blasting followed by the process according to the present invention. A metal part of the chemical bomb 100, for example, the head 110, the burster tube 111, the bomb shell 120 and the posture control blade 130, generally remains as solid metal fragments, metal powder or the like, while the burster (explosive) 112 and the chemical agents (hazardous substance) 121 remains as gas, liquid or solid matter depending on a material in use. If the whole residue or a part of the residue to be cleaned is a liquid residue A or a solid residue B as shown in FIG. 3, the residue A or B is positioned near an inner wall surface 10a of the pressure vessel 10, for example, as is collected on the bottom or adheres to the inner wall surface 10a. If the whole residue or a part of the residue to be cleaned is a gaseous residue C, the residue C diffuses in the pressure vessel 10. In short, the leaving portion of the residual substance may vary depending upon a phase of the residual substance.

The cleaning method according to the present invention enables decomposing any of the above residual substances. The details thereof are as follows.

First, the inner lid 33 and the pressure-resistant lid 11 are opened, and the above fixing device sets an explosive 1 for cleaning in a predetermined amount inside of the pressure vessel 10, preferably, separately from the inner wall surface 10a or more desirably, in the middle of the pressure vessel 10. The amount of the explosive 1 for cleaning is determined by analyzing the component and amount of a residual substance inside of the pressure vessel 10 and calculating an amount necessary for decomposing the analyzed component to a target value or below.

After the set of the explosive 1 for cleaning, the inner lid 33 and the pressure-resistant lid 11 are closed to tightly seal the pressure vessel 10, in which blasting disposal is performed. Specifically, the detonating apparatus detonates the explosive 1 for cleaning. The explosion causes a propagation of a shock wave. This compresses an air on the shock wave front to raise a temperature of the air. The shock wave reaches the inner wall surface 10a of the pressure vessel 10 to raise a temperature of a combustion gas to approximately 10000° C. or above by sharply raising the pressure thereof.

The thus produced high-temperature air and high-temperature explosive combustion gas have a function of instantaneously decomposing a substance to be cleaned, whether the substance is gas, liquid or solid matter. In other words, a residual substance remaining in the pressure vessel 10 before the performance of the cleaning method can be decomposed and cleaned in a short time, no matter whether the residue is any of gas, liquid or solid matter. This function gives a shortened treatment time regardless of the state of the residue.

This method is especially effective when the explosive 1 for cleaning being set in the middle of the pressure vessel 10 separate from the inner wall surface 10a, as is the case with this embodiment. Setting the explosive 1 in the middle position as above allows a high-temperature air and a high-temperature explosive combustion gas to reach each part of the inner wall surface 10a of the pressure vessel 10 uniformly with less bias than setting the explosive 1 in contact with the inner wall surface 10a. This makes it possible to effectively decompose any of the above liquid residue A, solid residue B and gaseous residue C remaining in mutually different positions, wherever they are left.

The present invention is however not limited to setting an explosive for cleaning in the middle of the pressure vessel 10. For example, it may be set in contact with the inner wall surface 10a of the pressure vessel 10 or in any position apart from the inner wall surface 10a. Alternatively, in a long pressure vessel extending in the axial directions, each explosive for cleaning may be set in a plurality of lengthwise dispersed positions.

Furthermore, a specific pressure-vessel structure according to the present invention is not limited to a double structure: for example, a single or triple structure is also feasible.

In the blasting step followed by the cleaning process according to the present invention, the kind of an object to be blasted is not limited. Although in the above embodiment is blasted a chemical bomb 100 containing burster (explosive) 112 and chemical (hazardous substance) 121, the object to be blasted may lack at least one of the burster 112 and the chemical 121, or may be a container filled with a hazardous substance such as an organic halogen, for example. A residual substance produced by blasting the above objects also can be effectively cleaned by the cleaning method according to the present invention.

In a blasting step where blasting is repeated several times, the same kind of object may be blasted in each of the treatments, or a different kind of object can be blasted in each treatment.

PRACTICAL EXAMPLE

To verify availability of the present invention, the inventors actually blasted a chemical bomb obtained by simulating the formation and explosive amount of the chemical bomb 100 using an explosive for blasting in the pressure vessel 10, and decomposed a residual substance produced thereby by exploding the explosive 1 for cleaning in a proper amount. Table 1 shows components of the residue (before the cleaning) and components thereof after decomposed (after the cleaning), wherein each analysis value indicates the concentration of a residual chemical (hazardous substance) in the gas.

TABLE 1

| | SIMULATED RESIDUAL-CHEMICAL CONCENTRATION (IN GAS) | |
|---|---|---|
| | OLEIC ACID (DOUBLE BOND) [mg/m$^3$N] | DICYANOBENZENE (TRIPLE BOND) [mg/m$^3$N] |
| BEFORE CLEANING | <0.08 | 0.02 |
| AFTER CLEANING | <0.08 | <0.005 |

Table 1 indicates that the residue concentration of dicyanobenzene (triple bond) is reduced by the cleaning from a high value of 0.02 [mg/m$^3$N] (immediately after blasting the simulated chemical bomb) before the cleaning to a value lower than 0.005 [mg/m$^3$N], that is, an analysis value permitting disposal of the residue. On the other hand, the residue concentration of an oleic acid (double bond), whichever before or after the cleaning, is below an analysis limit of 0.08 [mg/m$^3$N], which permits disposing of the residue.

As described so far, the present invention provides a method of decomposing a residue of an object to be blasted in a pressure vessel to clean it, following a blasting step of setting the object to be blasted and an explosive for blasting in the pressure vessel and blasting them therein. This method includes: a step of setting an explosive for cleaning, different from the object to be blasted, in an amount necessary for decomposing the residue of the object inside of the pressure vessel after the blasting step; and a step of decomposing the residue by exploding the explosive for cleaning in the pressure vessel.

This cleaning method achieves the cleaning only by setting the explosive for cleaning inside of the pressure vessel and exploding the set explosive for cleaning, thereby shortening the treatment time. Besides, the residue can be decomposed in a short time, whether it is gas, liquid or solid matter, in the following way. The explosion of the explosive for cleaning generates a propagation of a shock wave, which compresses an air on the shock wave face to raise the temperature. The shock wave reaches the inner wall surface of the pressure vessel to raise a temperature of a combustion gas of the explosive for cleaning to approximately 10000° C. or above by sharply raising the pressure thereof. This high-temperature air and high-temperature explosive combustion gas have a function of decomposing the residue in an instant, no matter whether it is gas, liquid or solid matter, which enables cleaning the residue in a short time regardless of the state thereof.

The explosive for cleaning is preferably set apart from the inner wall surface of the pressure vessel. Setting the explosive for cleaning in such a position allows a high-temperature air and a high-temperature explosive combustion gas to reach each part of the inner wall surface of the pressure vessel uniformly with less bias than setting the explosive for cleaning in contact with the inner wall surface of the pressure vessel.

The invention claimed is:

1. A method of cleaning an inside of a pressure vessel following a blasting operation of setting an object to be blasted with a blasting explosive in the pressure vessel and blasting them together in the pressure vessel, said method of cleaning comprising:
    setting a cleaning explosive in the pressure vessel without an additional object to be blasted, the pressure vessel containing a residue of the object previously blasted, and wherein, in the setting of the cleaning explosive, an amount of the cleaning explosive that is sufficient to decompose at least some of said residue of said object previously blasted inside of the pressure vessel is set; and
    decomposing the at least some residue in the pressure vessel by exploding the cleaning explosive.

2. The method of cleaning the inside of a pressure according to claim 1, wherein the cleaning explosive is set to a position in the pressure vessel separate from an inner wall surface of the pressure vessel.

3. The method of claim 1, wherein the amount of cleaning explosive is an amount that, when exploded in the pressure vessel, generates a shock wave therein, thereby compressing air on a shock wave face to raise the temperature of a combustion gas.

4. The method of claim 3, wherein, upon exploding the cleaning explosive, the temperature of the combustion gas increases to approximately 10,000° C.

* * * * *